United States Patent Office 2,714,587
Patented Aug. 2, 1955

2,714,587

AZO DYESTUFFS

Reinhard Neier and Walter Wehrli, Basel, Switzerland, assignors to Sandoz A. G., Basel, Switzerland, a Swiss firm No Drawing. Application February 11, 1952,
Serial No. 271,064

Claims priority, application Switzerland February 17, 1951

7 Claims. (Cl. 260—145)

The present invention relates to valuable dyestuffs which represent the combination of, on the one hand, a diazo or tetrazo compound from an amine or diamine of the formula

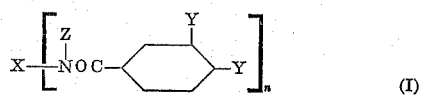

(I)

wherein X stands for a radical of the benzene or naphthalene series which may optionally carry an azo substituent, one Y stands for the $NH_2$ group, the other Y stands for a carboxyl group or an esterified carboxyl group, Z stands for hydrogen or an alkyl or aryl group, and n represents one of the integers 1 and 2, with, on the other hand, a compound containing a couplable methylene group or a hydroxybenzene or hydroxynaphthalene which couples in ortho-position to the azo group.

In order to prepare the amine or diamine of Composition (I), supra, the appropriate acid chloride corresponding to the formula

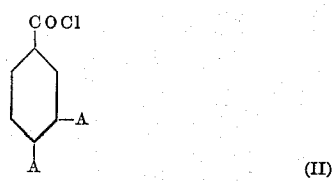

(II)

wherein one A stands for —$NO_2$ and the other A stands for —COO·lower alkyl, are employed. These acid chlorides may be prepared from the corresponding carboxylic acids, for example by the action of phosphorus pentachloride or thionyl chloride.

The acid chloride is reacted in aqueous solution or in an anhydrous solvent with the appropriate primary or secondary amine, preferably with an addition of an acid-binding agent such as sodium acetate, sodium carbonate, calcium carbonate or magnesium oxide or a tertiary base such as N-dimethylaminobenzene or pyridine. Saponification of the ester group of the thus-obtained acid amide and reduction of the nitro group to the amino group results in the initially-mentioned amine or diamine. Alternatively, the ester group may be saponified after the said reduction or only in the dyestuff itself. In those cases where, as hereinafter set forth, the metal complex of the dyestuff is prepared in substance, a separate saponification of the ester group is unnecessary, since it splits off readily during the metallization, as for example when the latter is a coppering carried out in a sodium acetate fusion.

Suitable for reaction with the acid chlorides, according to this invention, are the primary and secondary monoamines and diamines of the benzene and naphthalene series which, moreover, may be substituted by alkyl, aryl, aralkyl, halogen, hydroxy, acylamino, azo, carboxy and sulfo groups, etc. Illustrative of these are inter alia:

Aminobenzene,
1-aminobenzene-3-sulfonic acid,
1-aminobenzene-4-sulfonic acid,
1-aminobenzene-2-carboxylic acid,
1-aminobenzene-3-carboxylic acid,
1-aminobenzene-4-carboxylic acid,
1-amino-2-methylbenzene,
1-amino-3-methylbenzene,
1-amino-4-methylbenzene,
1-amino-2,4-dimethylbenzene,
1-amino-2,5-dimethylbenzene,
1-amino-2-chlorobenzene,
1-amino-3-chlorobenzene,
1-amino-4-chlorobenzene,
1-amino-2,5-dichlorobenzene,
1-amino-2,5-dichlorobenzene-4-sulfonic acid,
1,3-diaminobenzene,
1,4-diaminobenzene,
1,3-diaminobenzene-4-sulfonic acid,
1,4-diaminobenzene-3-sulfonic acid,
1,4-diaminobenzene-3-carboxylic acid,
4-acetylamino-1-aminobenzene,
4-carbethoxyamino-1-aminobenzene,
4-benzoylamino-1-aminobenzene,
4-amino-1,1'-azobenzene,
4,4'-diamino-1,1'-azobenzene,
4-amino-4'-hydroxy-1,1'-azobenzene-3'-carboxylic acid,
4 - amino - 4' - hydroxy - 1,1' - azobenzene - 3' - carboxy - 5'-sulfonic acid,
1-amino-4-hydroxybenzene-3-carboxylic acid,
1-amino-3-hydroxybenzene-4-carboxylic acid,
1 - amino - 4 - hydroxybenzene - 3 - carboxylic acid - 5 - sulfonic acid,
4,4'-diaminodiphenyl,
3,3'-dimethyl-4,4'-diaminodiphenyl,
3,3'-dimethoxy-4,4'-diaminodiphenyl,
3,3'-dichloro-4,4'-diaminodiphenyl,
4,4'-diaminodiphenyl-3-sulfonic acid,
4,4'-diaminodiphenyl-3,3'-disulfonic acid,
4,4'-diaminodiphenyl-3,3'-dicarboxylic acid,
1-amino-4-(4'-amino-benzoylamino)-benzene,
4,4'-diaminodiphenylurea,
4,4'-diaminostilbene-2,2'-disulfonic acid,
4,4'-diaminodiphenylamine,
4,4'-diaminodiphenylketone,
4,4'-diaminodiphenylmethane,
4,4'-diaminodiphenylsulfone,
1-(4'-aminophenyl)-3-methyl-5-pyrazolone,
1-(3'-aminophenyl)-3-methyl-5-pyrazolone,
the pyrazolone derivative of the formula

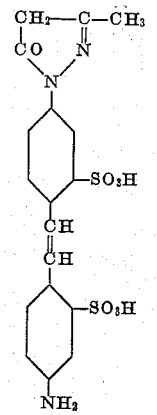

(III)

1-aminonaphthalene,
2-aminonaphthalene,
1-aminonaphthalene-5-sulfonic acid,
1-aminonaphthalene-6-sulfonic acid,
1-aminonaphthalene-7-sulfonic acid,
2-aminonaphthalene -6-sulfonic acid,
2-aminonaphthalene-3,6-disulfonic acid,
2-aminonaphthalene-4,8-disulfonic acid, 2-aminonaphthalene-5,7-disulfonic acid,
2-aminonaphthalene-6,8-disulfonic acid,
1-aminonaphthalene-3,6-disulfonic acid,
1-aminonaphthalene-3,8-disulfonic acid,
1-aminonaphthalene-4,8-disulfonic acid,
1-amino-8-hydroxynaphthalene-4-sulfonic acid,
2-amino-5-hydroxynaphthalene-7-sulfonic acid,
2-amino-8-hydroxynaphthalene-6-sulfonic acid,
1-amino-8-hydroxynaphthalene-6-sulfonic acid,
1-amino-8-hydroxynaphthalene-2,4-disulfonic acid,
1-amino-8-hydroxynaphthalene-3,6-disulfonic acid,
2-amino-8-hydroxynaphthalene-3,6-disulfonic acid,
N-monomethylaminobenzene,
N-monoethylaminobenzene,
N-monobenzylaminobenzene,
1-N-monoethylaminobenzene-3-sulfonic acid,
1-N-monoethylaminobenzene-4-sulfonic acid,
2-methyl-1-N-monoethylaminobenzene,
4-methyl-1-N-monoethylaminobenzene,
3-methoxy-1-N-monomethylaminobenzene,
2 - N - monomethylamino - 5 - hydroxynaphthalene - 7 - sulfonic acid,
2 - N - monomethylamino - 8 - hydroxynaphthalene - 6 - sulfonic acid, etc. This enumeration is intended to illustrate the wide variety of derivatives of the benzene and naphthalene series suitable for reaction with the aforesaid acid chlorides, but is not at all intended to be limitative.

As coupling components, use may be made of all hydroxybenzene and hydroxynaphthalene compounds which couple in ortho-position to the azo group. Particularly suitable for this purpose are for example 1,3-dihydroxybenzene derivatives and 4-alkyl-1-hydroxybenzene derivatives, and also hydroxynaphthalene sulfonic acids, and aminohydroxynaphthalene sulfonic acids and their N-substituted derivatives. However, use may be made of all other hydroxynaphthalene derivatives bearing substituents which are conventional in azo dyestuffs, as for example additional azo groups. As components with couplable methylene groups are meant primarily acetylacetic acid arylides and 5-pyrazolones, which may moreover contain substituents conventional in these compounds. These components comprise inter alia:

1-acetoacetylaminobenzene,
1-acetoacetylamino-2-methoxybenzene,
1-acetoacetylaminobenzene-3-sulfonic acid,
1-acetoacetylaminobenzene-4-sulfonic acid,
1-acetoacetylamino-2-methoxybenzene-x-sulfonic acid,
3-methyl-5-pyrazolone,
1-phenyl-3-methyl-5-pyrazolone,
1-(4'-aminophenyl)-3-methyl-5-pyrazolone,
1-(3'-sulfophenyl)-3-methyl-5-pyrazolone,
1-(4'-sulfophenyl)-3-methyl-5-pyrazolone,
1-(3'-carboxyphenyl)-3-methyl-5-pyrazolone,
1-phenyl-5-pyrazolone-3-carboxylic acid,
1-phenyl-5-pyrazolone-3-carboxylic acid amide,
1-(4'-hydroxy-3'-carboxyphenyl)-3-methyl-5-pyrazolone, etc. These components with couplable methylene groups also comprise: barbituric acid, 1,3-indandiene, oxindole, dihydroresorcinol and a great many other components, so that the exemplary compounds here enumerated are not at all intended to be restrictive in scope.

Depending upon the selected diazo and coupling components, dyestuffs are obtained which yield yellow, red, violet, blue and gray to green dyeings on cellulosic fibers. For example, yellow dyestuffs are obtained by coupling diazo compounds from monoamines or diamines of the benzene or diphenyl series with pyrazolones or acetylacetic acid arylides. The same diazo components, when coupled with hydroxynaphthalene derivatives, yield red to violet dyestuffs. Red, blue, and green dyestuffs are for example obtained with diazo components derived from naphthalene compounds, for example from 2-(4'-amino-3' - carboxyl - 1' - benzoylamino) - 5 - hydroxynapthalene-7-sulfonic acid or 2-(3'-amino-4'-carboxy-1'-benzoylamino)-5-hydroxynaphthalene-7-sulfonic acid.

The dyestuffs are suitable for metallization in substance and on the fiber. Metallization in substance can, for example, be carried out with salts of chromium, cobalt, nickel, lead, manganese or copper in neutral or weakly acetic acid solution or in sodium acetate metals. Coppering is preferably effected in alkaline solution with copper tetramine complexes. For metallization on the fiber, the dyeings are aftertreated with salts of bivalent and polyvalent metals. The metallized dyeings on cellulosic fibers are distinguished by good fastness to light and to washing.

The following examples set forth representative exemplary embodiments of the invention, and these examples are intended to be solely illustrative and not at all limitative. In these examples, the parts and percentages are by weight and the temperatures are expressed in degrees centigrade.

*Example 1*

51 parts of 4,4' - di - (4" - amino - 3" - carboxybenzoylamino)-diphenyl are dissolved in 700 parts of water with the aid of 8 parts of sodium hydroxide, and, after addition of 13.8 parts of sodium nitrite, the solution is added dropwise to 55 parts of hydrochloric acid of 30% strength. The tetrazo compound, which separates as a yellow-brown precipitate, is poured at 0–5° into a solution of 50.8 parts of 1-(4'-sulfophenyl)-3-methyl-5-pyrazolone in 200 parts of water and 16 parts of sodium hydroxide, the mixture being then stirred until the coupling is completed, which should be the case after several hours. The resultant dyestuff is precipitated with sodium chloride, isolated and dried. It corresponds to the formula

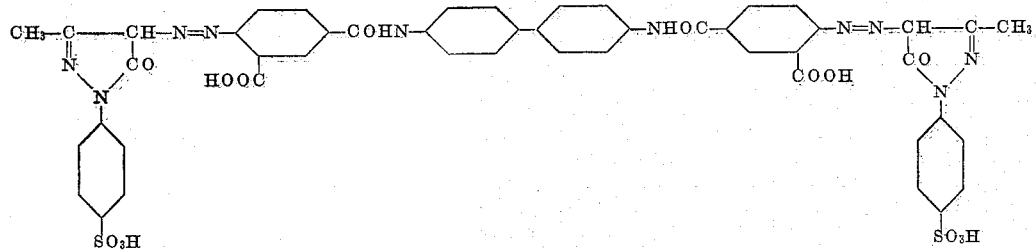

It is a light-brown powder which dissolves in water with yellow coloration and which possesses good substantivity. It dyes cotton and regenerated cellulose in light-yellow shades. Upon aftercoppering, the dyeings are converted into a full yellow, which is characterized by good fastness to light and to washing.

The dyestuff can also be coppered in substance, for example by dissolving 9.64 parts of the dyestuff in 300 parts of water and then stirring at 90° with 5 parts of copper sulfate in presence of 5 parts of sodium acetate until the metal complex is formed. The complex is then precipitated with sodium chloride, and is isolated and dried. On cotton and regenerated cellulose, the copper complex yields the same shade as the product aftercoppered on the fiber.

The nickel complex can be prepared by stirring 9.64 parts of the metal-free dyestuff with 5 parts of sodium acetate and 5.6 parts of nickel sulfate in 300 parts of water at 80–90° until the metal complex is formed. The thus-prepared nickel complex is isolated and also dyes cotton and regenerated cellulose in yellow shades.

In the preparation of the lead complex, 9.64 parts of the metal-free dyestuff are stirred for example with 5 parts of sodium acetate and 6.5 parts of lead acetate in 300 parts of water at 80–90° until the metal complex is formed. The complex is then precipitated with sodium chloride, isolated and dried. It also dyes cotton and regenerated cellulose in yellow shades.

To prepare the chromium complex, 9.64 parts of the metal-free dyestuff are stirred for example with 5 parts of sodium acetate and 11.3 parts of chrome alum in 300 parts of water at 80–90° until the metal complex is formed. It dyes cotton and regenerated cellulose in yellow shades.

4,4' - di - (4" - amino - 3" - carboxy - benzoylamino)-diphenyl can be prepared for example by reacting 4,4'-diaminodiphenyl with 3-carbomethoxy-4-nitro-1-benzoyl chloride in an organic solvent in the presence of an acid-binding agent. By subsequent saponification of the dicarboxylic acid ester and reduction of the nitro groups, the desired diamino derivatives are obtained.

Similar dyestuffs are obtained when, while otherwise proceeding as hereinbefore described, the 4,4'-di-(4"-amino-3"-carboxy-benzoylamino)-diphenyl is replaced by an equivalent quantity of one of the following:

4,4' - di - (4" - amino - 3" - carboxy - benzoylamino)-3,3'-dimethyldiphenyl,
4,4' - di - (4" - amino - 3" - carboxy - benzoylamino)-3,3'-dimethoxydiphenyl,
4,4' - di - (4" - amino - 3" - carboxy - benzoylamino)-diphenyl-3,3'-disulfonic acid,
4,4' - di - (4" - amino - 3" - carboxy - benzoylamino)-benzoylaminobenzene,
1,4 - di - (4' - amino - 3' - carboxy - benzoylamino)-benzene,
4,4' - di - (4" - amino - 3" - carboxy - benzoylamino)-stilbene-2,2'-disulfonic acid, which may be prepared in a manner analogous to that set forth in the preceding paragraph.

Example 2

69.6 parts of 4,4'-di-(4"-amino-3"-carboxy-benzoylamino)-stilbene-2,2'-disulfonic acid are dissolved in 500 parts of water with the aid of 10 parts of sodium hydroxide and, after addition of 13.8 parts of sodium nitrite, the mixture is added dropwise to 65 parts of hydrochloric acid of 30% strength, while cooling. The tetrazo compound separates out as a yellow-brown precipitate which is then poured, while cooling with ice, into a solution of 25.4 parts of 1-(4'-sulfophenyl)-3-methyl-5-pyrazolone in 12 parts of sodium hydroxide and 100 parts of water. As soon as the coupling component has disappeared, which usually requires only a short time, 17.4 parts of 1-phenyl-3-methyl-5-pyrazolone, dissolved in 100 parts of water and 4 parts of sodium hydroxide, are added. Upon completion of the coupling, the resultant disazo dyestuff is precipitated with sodium chloride and isolated. It corresponds to the formula

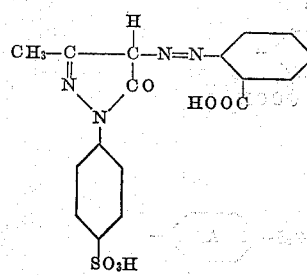

The new dyestuff is a yellow-brown powder which dissolves in water with yellow coloration. It dyes cotton in light-yellow shades which are converted, upon after-coppering, into a full yellow which is distinguished by good fastness to light and to washing. The dyestuff, aftercoppered in substance by treatment with copper salts in the presence of sodium acetate at elevated temperature, yields the same shade on cotton as does the product which is aftercoppered on the fiber.

4,4' - di - (4" - amino - 3" - carboxy - benzoylamino)-stilbene-2,2'-disulfonic acid can be prepared for example by reacting 4,4'-diamino-stilbene-2,2'-disulfonic acid with 3-carbomethoxy-4-nitro-1-benzoyl chloride in aqueous solution in the presence of an acid-binding agent, whereby the dibenzoylamino compound is formed. The dicarboxylic acid ester is then saponified and the two nitro groups reduced.

Similar dyestuffs, the dyeings of which are however of a somewhat lighter yellow shade, are obtained by following the procedure outlined in the first paragraph of the present example, but replacing the 1-(4'-sulfophenyl)-3-methyl-5-pyrazolone by an equivalent quantity of an acetoacetylaminobenzenesulfonic acid, such for example as 1-acetoacetylaminobenzene-3-sulfonic acid, 1-acetoacetylaminobenzene-4-sulfonic acid or 1-acetoacetylamino-2-methoxybenzene-x-sulfonic acid.

Moreover, the 1-phenyl-3-methyl-5-pyrazolone may also be replaced by an equivalent amount of 1-acetoacetylaminobenzene or 1-acetoacetylamino-2-methoxybenzene.

Dyestuffs with similar properties are likewise obtained when, while otherwise proceeding as described in this example, the 4,4' - di - (4" - amino - 3" - carboxybenzoyl amino)-stilbene-2,2'-disulfonic acid is replaced by an equivalent quantity of one of the following diamines:

1,4-di-(4'-amino-3'-carboxy-benzoylamino)-benzene,
4,4'-di-(4"-amino-3"-carboxy-benzoylamino)-diphenyl,
4,4' - di - (4" - amino - 3" - carboxy - benzoylamino)-3,3'-dimethoxydiphenyl,
4,4' - di - (4" - amino - 3" - carboxy-benzoylamino)-3,3'-dimethyldiphenyl,
4,4' - di - (4" - amino - 3" - carboxy-benzoylamino)-diphenylurea, etc.

Example 3

76.2 parts of the dyestuff of the formula

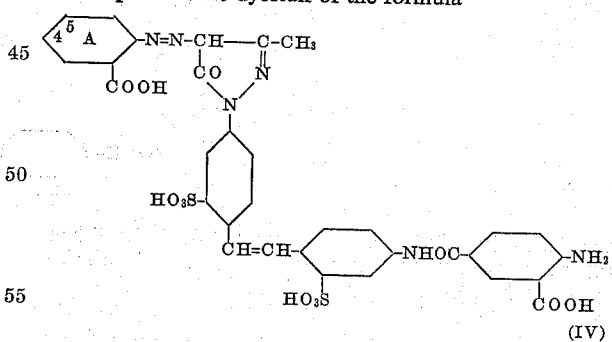

are dissolved in 100 parts of water containing 8 parts of sodium hydroxide. After the addition of 6.9 parts of sodium nitrite, the solution is poured slowly, while cooling, into 65 parts of hydrochloric acid of 30% strength. The precipitated yellow-brown diazo compound is then coupled with 20.7 parts of 1-acetoacetylamino-2-methoxy-benzene, dissolved in 100 parts of water and

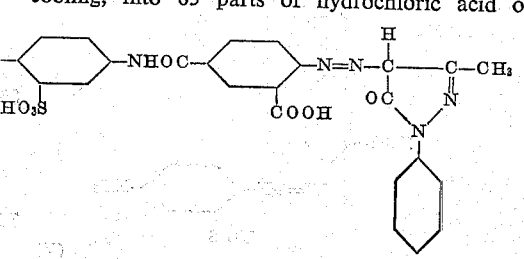

20 parts of sodium hydroxide. The thus-obtained yellow dyestuff is salted out and isolated. It corresponds to the formula

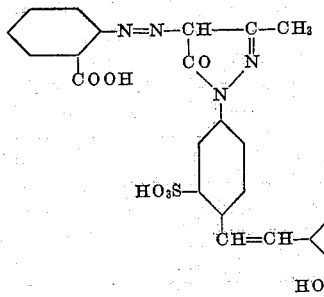

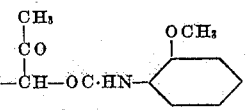

The new dyestuff is a yellow-brown powder which dissolves in water with yellow coloration. It dyes cotton in clear yellow shades which, upon being aftercoppered, are converted into light greenish-yellow of good fastness to light and to washing.

The dyestuff can also be coppered in substance, by stirring 11.4 parts of dyestuff with 5 parts of sodium acetate and 5 parts of copper sulfate in 300 parts of water at 80–90° until the metal complex is formed, whereupon the latter is precipitated with sodium chloride, isolated and dried. It dyes cotton and regenerated cellulose in the same yellow shades as does the product aftercoppered on the fiber.

The nickel complex is prepared by stirring 11.4 parts of the metal-free dyestuff with 5 parts of sodium acetate and 5.6 parts of nickel sulfate in 300 parts of water at 80–90° until the metal complex is formed. It is worked up like the copper complex and also dyes cotton and regenerated cellulose in yellow shades.

The preparation of the cobalt complex takes place for example by stirring 11.4 parts of the metal-free dyestuff with 5 parts of sodium acetate and 5.6 parts

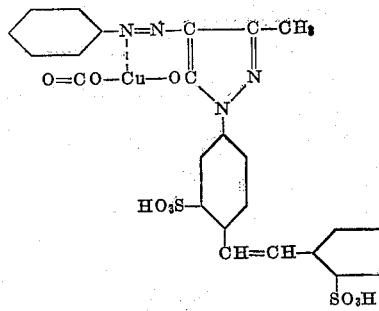

of cobalt sulfate in 300 parts of water at 80–90°. When the complex compound has been formed, it is precipitated with sodium chloride, isolated and dried. It dyes cotton and regenerated cellulose in yellow shades.

The dyestuff of Formula IV can be prepared for example by reacting the monoazo dyestuff of the formula

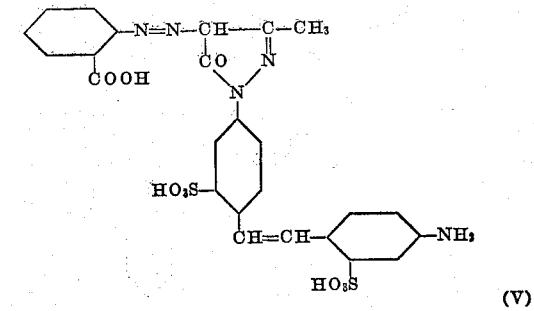

(V)

with 3-carbomethoxy-4-nitro-1-benzoyl chloride in aqueous solution in the presence of an acid-binding agent, saponifying the ester and reducing the nitro group to the amino group.

Similar dyestuffs are obtained when, while otherwise proceeding as described in the present example, the coupling component 1-acetoacetylamino-2-methoxybenzene is replaced by an equivalent quantity of 1-acetoacetylaminobenzene, 1-acetoacetylamino-3-hydroxybenzene-4-carboxylic acid, 1-acetoacetylamino-4-hydroxybenzene-3-carboxylic acid, 1-acetoacetylaminobenzene-4-carboxylic acid, 1-acetoacetylamino-2-methoxybenzene-x-sulfonic acid, the acetoacetylamino derivative of the formula

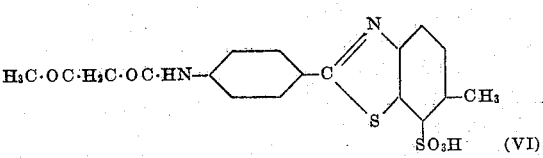

(VI)

barbituric acid, 1-phenyl-3-methyl-5-pyrazolone or 1-(3′-carboxy-4′-hydroxyphenyl)-3-methyl-5-pyrazolone.

Thus, by using 1 - acetoacetylaminobenzene - 4 - carboxylic acid as a coupling component, a dyestuff is obtained, the copper complex compound of which corresponds to the formula

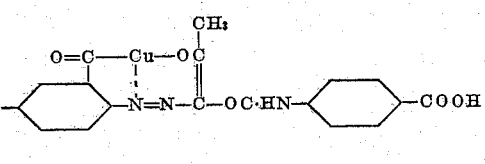

and dyes cotton in light greenish-yellow shades of good fastness to light and washing.

Similar dyestuffs are also obtained when, in place of the dyestuff of Formula IV, the corresponding derivatives substituted in 5-position of the nucleus A by a sulfonic acid group or in 4-position by the sulfonic acid-(2′-carboxyphenyl)-amide group:

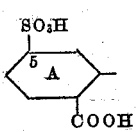

or

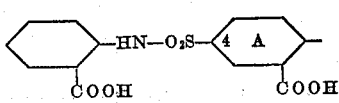

are used.

Example 4

84.2 parts of the dyestuff of the formula

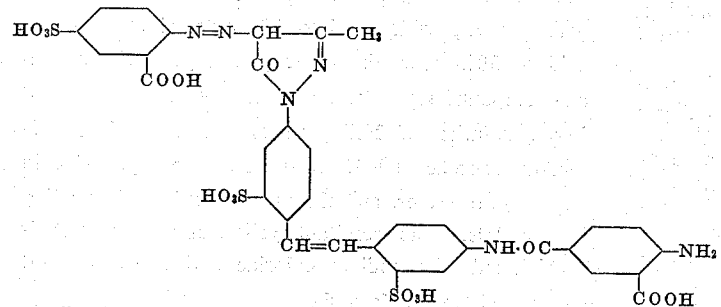

are dissolved in 700 parts of water with the aid of 8 parts of sodium hydroxide. After the addition of 6.9 parts of sodium nitrite, the solution is poured slowly and while cooling into 45 parts of hydrochloric acid of 30% strength, whereupon a yellow-brown diazo compound separates out. The suspension is poured into a solution of 40 parts of the acetoacetylamino derivative of Formula VI and 15 parts of sodium hydroxide in 150 parts of water, stirring and cooling being continued until the coupling is complete. The resultant dyestuff is precipitated with sodium chloride and isolated. It corresponds to the formula

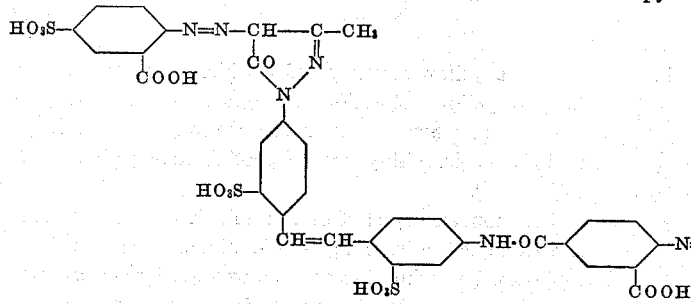

The new dyestuff is a yellow-brown powder which dissolves in water with yellow coloration and dyes cotton in clear yellow shades which, upon aftercoppering, are converted into a light greenish-yellow of good fastness to light and to washing.

The dyestuff of Formula VII can be prepared for example by reacting the monoazo dyestuff of the formula

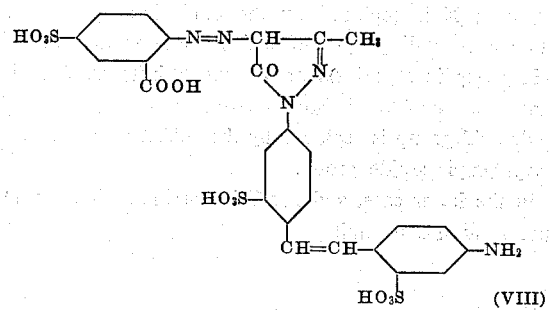

with 3-carbomethoxy-4-nitro-1-benzoyl chloride in aqueous solution with the addition of an acid-binding agent, saponifying the ester, and reducing the nitro group to the amino group.

Similar dyestuffs are obtained when, while otherwise proceeding as described in this example, the coupling component of Formula VI is replaced by the equivalent quantity of 1-acetoacetylamino-2-methoxybenzene, 1-acetoacetylaminobenzene, 1-acetoacetylaminobenzene-4-carboxylic acid, 1-acetoacetylamino-4-hydroxybenzene-3-carboxylic acid, 1-acetoacetylamino-3-hydroxybenzene-4-carboxylic acid, barbituric acid or 1-phenyl-3-methyl-5-pyrazolone.

Example 5

50 parts of the monoazo dyestuff of the formula

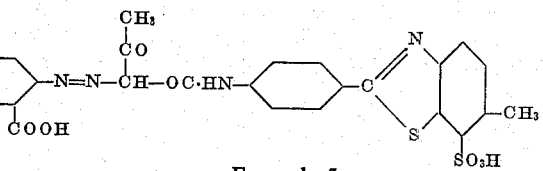

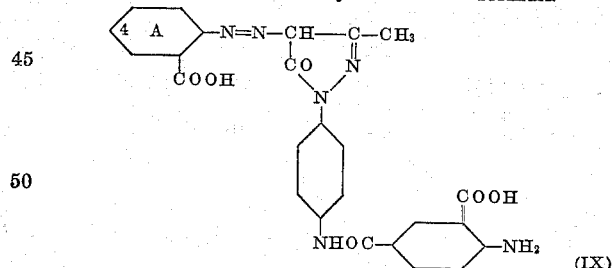

are dissolved in 800 parts of water with the aid of 4 parts of sodium hydroxide. After the addition of 6.9 parts of sodium nitrite, the solution is added dropwise and while cooling with ice into 30 parts of hydrochloric acid of 30% strength, whereupon a yellow-brown diazo compound separates out. The suspension is poured into a solution of 28.7 parts of 1-acetoacetylamino-2-methoxybenzene-x-sulfonic acid and 12 parts of sodium hydroxide in 100 parts of water, and the mass stirred until coupling is complete. The resultant yellow-brown dyestuff is salted out with sodium chloride and is then isolated. It corresponds to the formula

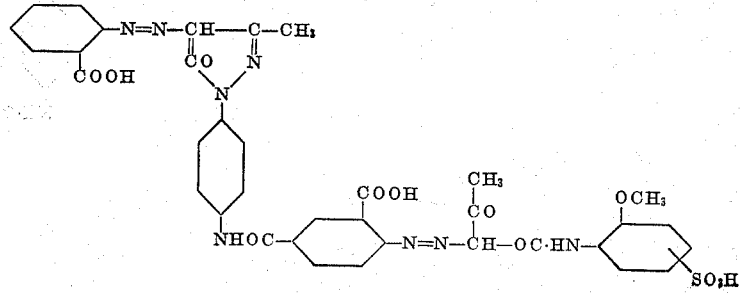

The new dyestuff is a yellow-brown powder which dissolves in water with yellow coloration. It dyes cotton in clear yellow shades which, upon aftercoppering, are converted into a greenish yellow of good fastness to light.

The monoazo dyestuff of Formula IX can be prepared for example by reacting 1-(4'-aminophenyl)-3-methyl-5-pyrazolone with 3-carbomethoxy-4-nitro-1-benzoyl chloride in an organic solvent in the presence of an acid-binding agent. After saponification of the ester and reduction of the nitric group to amino, the pyrazolone derivative is coupled with diazotized 1-aminobenzene-2-carboxylic acid to yield the desired monoazo dyestuff.

Similar dyestuffs are obtained when, while otherwise proceeding as described in this example, the coupling component 1-acetoacetylamino-2-methoxybenzene-x-sulfonic acid is replaced by an equivalent quantity of 1-acetoacetylaminobenzene-4-sulfonic acid, 1-acetoacetylaminobenzene-4-carboxylic acid, 1-acetoacetylamino-4-hydroxybenzene-3-carboxylic acid, 1-acetoacetylamino-3-hydroxybenzene-4-carboxylic acid or 1-(4'-sulfophenyl)-3-methyl-5-pyrazolone.

Similar dyestuffs are likewise obtained when, while otherwise proceeding as described in the present example, the dyestuff of Formula IX is replaced by an equivalent quantity of a corresponding dyestuff which is substituted in 4-position of the nucleus A by the sulfonic acid-(2'-carboxyphenyl)-amide group.

*Example 6*

58 parts of the monoazo dyestuff of the formula

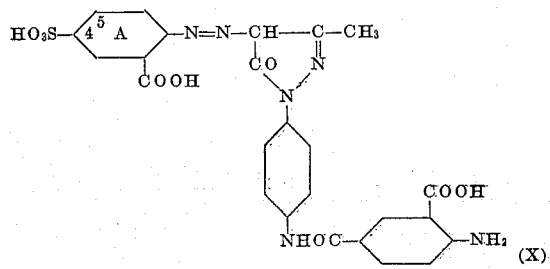

are dissolved in 600 parts of water containing 4 parts of sodium hydroxide. After the addition of 6.9 parts of sodium nitrite, the solution is added dropwise and while cooling with ice into 30 parts of hydrochloric acid of 30% strength, whereupon a yellow-brown diazo compound separates out. The suspension is poured into a solution of 20.7 parts of 1-acetoacetylamino-2-methoxybenzene and 12 parts of sodium hydroxide in 100 parts of water, and the mass stirred until coupling is complete. The resultant yellow-brown dyestuff is precipitated with sodium chloride and is isolated. It corresponds to the formula

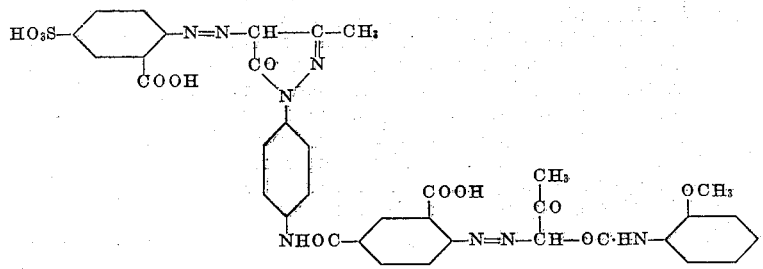

It is a yellow-brown powder which dissolves in water with yellow coloration and dyes cotton in clear yellow shades which, upon aftercoppering, are converted into a light greenish-yellow of good fastness to light and to washing.

The monoazo dyestuff of Formula X can be prepared for example by reacting 1-(4'-aminophenyl)-3-methyl-5-pyrazolone with 3-carbomethoxy-4-nitro-1-benzoyl chloride in an organic solvent in the presence of an acid-binding agent. After saponification of the ester and reduction of the nitro group to amino, the pyrazolone derivative is coupled with the diazo compound from 1-amino-2-carboxybenzene-4-sulfonic acid to yield the desired monoazo dyestuff.

Similar dyestuffs result when, while other proceeding as described in this example, the monoazo dyestuff of Formula X is replaced by the equivalent quantity of the corresponding dyestuff which contains the sulfonic acid group in 5-position of nucleus A instead of in the 4-position or of the dyestuff wherein the 4-positioned sulfonic acid group is replaced by the sulfonic acid-(2'-carboxyphenyl)-amide group.

In the latter case, a dyestuff is obtained which corresponds to the formula

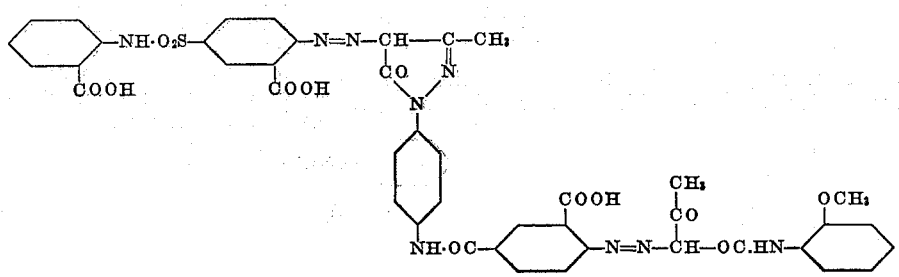

Similar dyestuffs are likewise obtained when, while otherwise proceeding as described in this example, the coupling component 1-acetoacetylamino-2-methoxybenzene is replaced by an equivalent quantity of 1-acetoacetylaminobenzene, barbituric acid, 1-phenyl-3-methyl-5-pyrazolone or the acetoacetylamino derivative of Formula VI.

*Example 7*

100.2 parts of the azo dyestuff of the formula

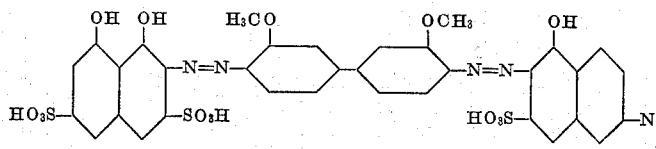

are dissolved in 3000 parts of water containing 15 parts of sodium hydroxide and, after addition of 6.9 parts of sodium nitrite, the solution is poured into 75 parts of hydrochloric acid of 30% strength, while cooling. The suspension, containing the diazo compound in the form of a dark precipitate, is poured into a solution of 17.7 parts of 1-acetoacetylaminobenzene and 20 parts of sodium hydroxide in 100 parts of water, and stirring and ice cooling continued until coupling is completed. The thus-obtained dyestuff is precipitated with sodium chloride and is isolated. It corresponds to the formula

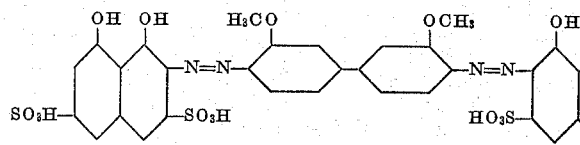

The copper complex of the dyestuff is obtained by stirring the dyestuff, thus isolated, with a solution of 47.5 parts of copper sulfate and 127 parts of aqueous ammonia of 25% strength in 3000 parts of water at 80–100° until the copper complex forms, which is the case after about 15 hours. It corresponds to the formula

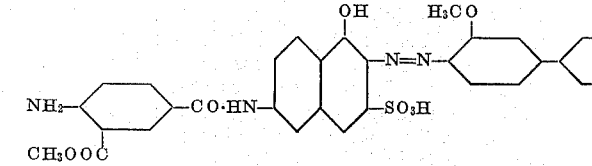

The metal-free dyestuff is a dark powder which dissolves in water with blue-gray coloration. It dyes cotton in blue-gray shades which are distinguished by noteworthy fastness to light and to washing.

The starting dyestuff XI can be prepared by coupling tetrazotized 3,3'-dimethoxy-4,4'-diaminodiphenyl on the one hand with 1,8-dihydroxynaphthalene-3,6-disulfonic acid and on the other hand with 2-(3'-amino-4'-carbomethoxy - 1' - benzoylamino) - 5 - hydroxynaphthalene-7-sulfonic acid in alkaline solution. The last-named reagent is obtained by the reaction between 2-amino-5-hydroxynaphthalene-7-sulfonic acid and 3-nitro-4-carbomethoxy-1-benzoyl chloride in aqueous solution in the presence of an acid-binding agent, followed by reduction of the nitro group to amino.

Dyestuffs with similar properties are obtained when, while otherwise proceeding as described in this example, the coupling component 1,8-dihydroxynaphthalene-3,6-disulfonic acid in the starting dyestuff is replaced by 1-hydroxynaphthalene-3,6-disulfonic acid,
1-hydroxynaphthalene-3,8-disulfonic acid, or
1-hydroxynaphthalene-3,6,8-trisulfonic acid.

By replacing the 2-(3'-amino-4'-carbomethoxy-1'-benzoylamino)-5-hydroxynaphthalene-7-sulfonic acid by 2-(3' - carbomethoxy - 4' - amino - 1' - benzoylamino) - 5 - hydroxynaphthalene-7-sulfonic acid, a greenish-blue dyestuff is obtained, while if it is replaced by 2-(3'-amino-4' - carbomethoxy - 1' - N - methyl - benzoylamino) - 5-hydroxynaphthalene-7-sulfonic acid or 2-(3'-amino-4' - carbomethoxy - 1' - N - ethyl - benzoylamino) - 5 - hydroxynaphthalene-7-sulfonic acid, blue-gray dyestuffs are produced.

If, as coupling component, the 1-acetoacetylaminobenzene is replaced by 1-phenyl-3-methyl-5-pyrazolone, blue-gray dyestuffs result, while if it is replaced by 2-hydroxynaphthalene, the products dye cotton in marine-blue shades.

*Example 8*

109.8 parts of the azo dyestuff of the formula

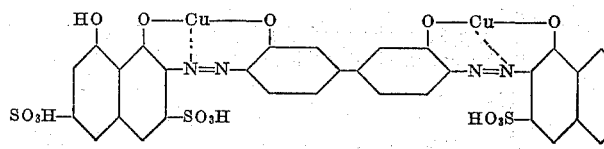

are dissolved in 4000 parts of water, 6.9 parts of sodium nitrite added, and the solution poured into 50 parts of hydrochloric acid of 30% strength, while cooling. The suspension, containing the tetrazo compound as a dark precipitate, is poured into a solution of 50.8 parts of 1-(4'-sulfophenyl)-3-methyl-5-pyrazolone and 24 parts of sodium hydroxide in 200 parts of water, and the mass stirred and cooled with ice until coupling is complete. The dyestuff, after isolation, is heated to 80–100° in a solution of 62.5 parts of copper sulfate and 170 parts of aqueous ammonia of 25% strength until the coppering, and concomitant splitting of the methoxy groups, is complete, which is the case after about 15 hours. The copper complex is then salted out with sodium chloride and isolated.

The uncoppered dyestuff corresponds to the formula

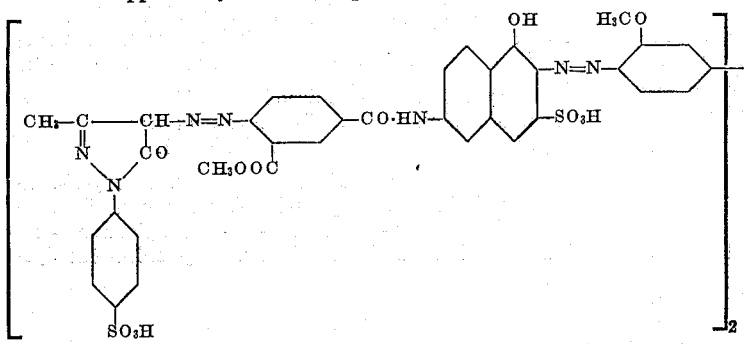

It is a dark powder which dissolves in water with gray coloration. It dyes cotton in neutral gray shades of good fastness properties.

The aforementioned dyestuff of Formula XII can be prepared by coupling 1 mol of tetrazotized 3,3'-dimethoxy-4,4'-diaminodiphenyl with 2 mols of 2-(3'-carbomethoxy - 4' - amino - 1' - benzoylamino) - 5 - hydroxynaphthalene-7-sulfonic acid. The latter is obtained by the reaction, in aqueous solution, of 2-amino-5-hydroxynaphthalene-7-sulfonic acid with 3-carbomethoxy-4-nitro-1-benzoyl chloride in the presence of an acid-binding agent, followed by the reduction of the nitro group of the thus-produced intermediate to the amino group. By replacing the 2-(3'-carbomethoxy-4'-amino-1'-benzoylamino)-5-hydroxynaphthalene-7-sulfonic acid by 2-(3'-amino - 4' - carbomethoxy - 1' - benzoylamino) - 5 - hydroxynaphthalene-7-sulfonic acid, a dyestuff of similar properties is obtained.

Similar dyestuffs are likewise obtained if the coupling component 1-(4'-sulfophenyl)-3-methyl-5-pyrazolone is replaced by 1-(3'-carboxy-4'-hydroxyphenyl)-3-methyl-5-pyrazolone or by 1-acetoacetylamino-2-methoxybenzene-x-sulfonic acid.

Similar dyestuffs are also obtained when, in the starting compound of Formula XII, the hydrogen atom designated by + is replaced by a methyl or ethyl group.

Example 9

27 parts of 3-carboxy-4-aminobenzene-1-carboxylic acid-phenylamide and 4 parts of sodium hydroxide are dissolved in 200 parts of water, 6.9 parts of sodium nitrite added, and the solution poured into 30 parts of hydrochloric acid of 30% strength. The resultant brown suspension of diazo compound is admixed with a solution of 26.6 parts of the dipyrazolone of the formula

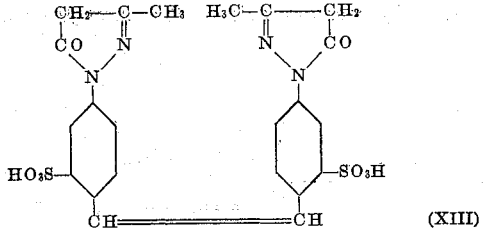

in 4 parts of sodium hydroxide, 10 parts of sodium carbonate and 200 parts of water, and the mass is stirred at 0–5° until the dyestuff formation is complete, which requires several hours. The dyestuff is precipitated with sodium chloride, and is isolated and dried. It corresponds to the formula

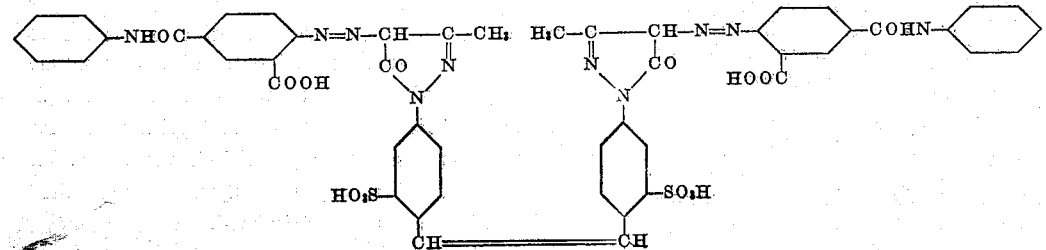

The new dyestuff is a light-brown powder which dissolves in water with yellow coloration, and dyes cotton and regenerated cellulose in light yellow shades. Upon aftercoppering, the color of the dyeings changes to a full yellow which is characterized by good fastness to light and washing.

3-carboxy-4-aminobenzene-1-carboxylic acid-phenylamide can be prepared for example by reacting aminobenzene with 4-nitro-3-carbomethoxy-1-benzoyl chloride in an organic solvent in the presence of anhydrous sodium acetate. By saponifying the carboxylic acid ester and reducing the nitro-group to amino, the desired amino compound is obtained.

Similar dyestuffs are obtained when, while otherwise proceeding as described in this example, the 3-carboxy-4-aminobenzene-1-carboxylic acid-phenylamide is replaced by an equivalent quantity of 3-carboxy-4-aminobenzene-1-carboxylic acid-N-methyl-phenylamide, 3-carboxy-4-aminobenzene-1-carboxylic acid-N-ethyl-phenylamide, 3-carboxy-4-aminobenzene-1-carboxylic acid-diphenylamide or 3-carboxy-4-aminobenzene-1-carboxylic acid-(2'-, 3'- or 4'-methyl)-phenylamide.

Example 10

1 part of the first dyestuff according to Example 4 is dissolved in water and is added to a porcelain receptacle containing 2000 parts of water and 10 parts of sodium sulfate. 50 parts of cotton cloth are introduced into this bath at 60° and the temperature then raised to 90–100° with frequent movement of the material. When, after about one hour, the dye has drawn onto the fabric, the temperature is allowed to drop. If aftercoppering is desired, the light yellow dyed material is introduced into a bath at 60–70° containing a solution of 5 parts of copper sulfate and 1 part of acetic acid in 2000 parts of water. The material is manipulated in this bath for 30 minutes, after which it is rinsed with water.

Having thus disclosed the invention what claimed is:

1. An azo dyestuff which corresponds to the formula

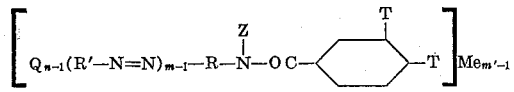

wherein each of $m$ and $n$ is one of the integers 1 and 2, R stands—when $m$ is 1—for a member selected from the group consisting of mononuclear radicals of the benzene series and binuclear radicals of the benzene series wherein the benzene nuclei are connected by a bridge selected from the group consisting of the simple diphenyl linkage, —CH=CH—, —NH·CO— and —NH·CO·NH—, and—when m is 2—for a member selected from the group consisting of radicals of the pyrazolone series and the naphthalene series, R' stands for a member selected from the group consisting of mono- and binuclear radicals of the benzene series, one T stands for the residue of an azo component selected from the group consisting of residues of the pyrazolone and the acetoacetylaminobenzene series, barbituric acid and of hydroxybenzenes and hydroxynaphthalenes coupled in ortho-position to the hydroxy group, and the other T stands for a member selected from the group consisting of —COOH and —COO·lower alkyl, Z stands for a member selected from the group consisting of hydrogen, lower alkyl and radicals of the benzene series, Q stands for a member selected from the group consisting of a residue of an azo component of the naphthalene series and of a substituent corresponding to the formula

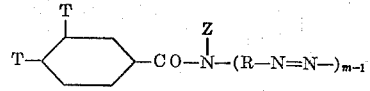

Me stands for a heavy metal atom selected from the group consisting of chromium, manganese, cobalt, nickel, copper and lead atoms, and m' is one of the integers 1 to 7.

2. An azo dyestuff according to claim 1, wherein the heavy metal atom is copper.

3. The azo-dyestuff corresponding to the formula

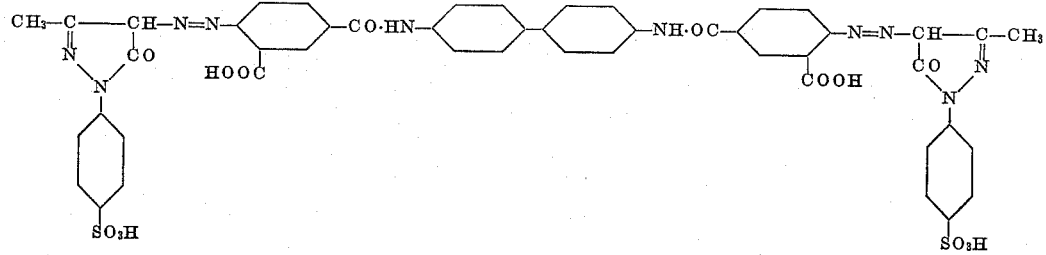

4. The azo dyestuff corresponding to the formula

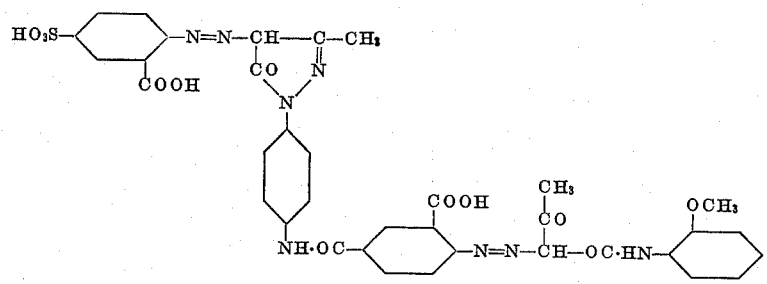

5. The azo dyestuff corresponding to the formula

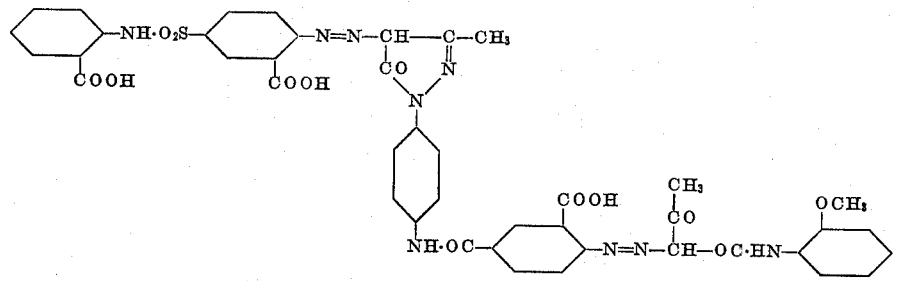

6. The azo dyestuff corresponding to the formula

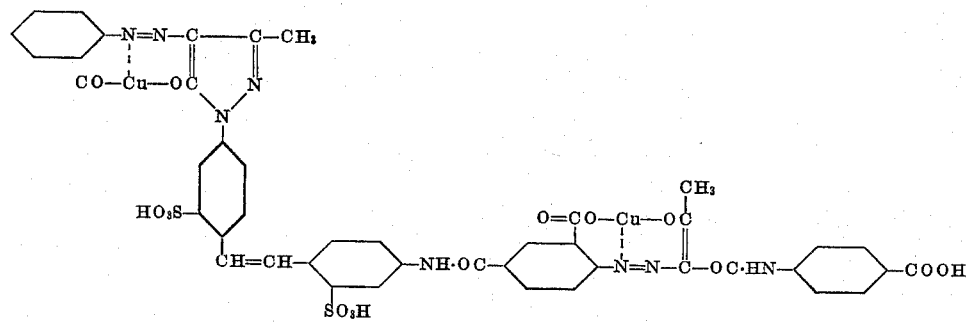

7. The azo dyestuff corresponding to the formula
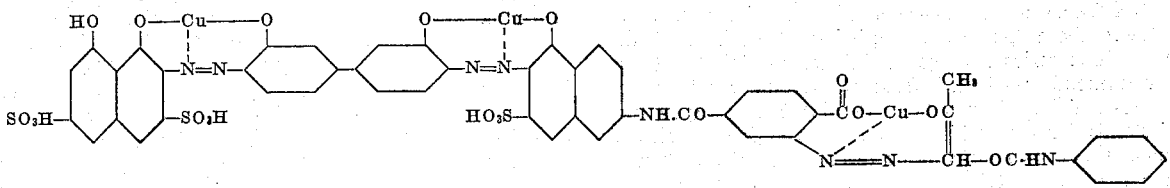
References Cited in the file of this patent
UNITED STATES PATENTS
| | | |
|---|---|---|
| 2,218,299 | Schmid | Oct. 15, 1940 |
| 2,306,681 | Zerweck et al. | Dec. 29, 1942 |
| 2,507,754 | Bossard et al. | May 16, 1950 |